Sept. 2, 1969 D. R. ANDREWS ET AL 3,465,302

BUFFERED TELETYPEWRITER DEVICE

Filed March 21, 1967 2 Sheets-Sheet 1

INVENTORS DONALD R. ANDREWS
ELIOTT D. JAMES

BY John W. Girvin, Jr.

ATTORNEY

Sept. 2, 1969 D. R. ANDREWS ET AL 3,465,302

BUFFERED TELETYPEWRITER DEVICE

Filed March 21, 1967 2 Sheets-Sheet 2

United States Patent Office 3,465,302

Patented Sept. 2, 1969

3,465,302

BUFFERED TELETYPEWRITER DEVICE

Donald R. Andrews, Lexington, Ky., and Eliott D. James, Palm Beach Gardens, Fla., assignors to International Business Machines Corporation, Armonk, N.Y., a corporation of New York Filed Mar. 21, 1967, Ser. No. 624,891
Int. Cl. G11c *19/00*
U.S. Cl. 340—172.5 9 Claims

ABSTRACT OF THE DISCLOSURE

An apparatus for transmitting and receiving intelligence and having a storage device for storing messages which have been received and for storing messages to be transmitted. Received messages can be directly printed with appropriate register buffering or can be stored. Polling requests are immediately answered without interrupting other data manipulation. Additionally, message interrupt can be initiated by the same control circuitry that handles polling requests. Polling and control responses are sent through the registers utilized for data transmission and receipt.

CROSS REFERENCES TO RELATED APPLICATIONS

"Master-Slave Net Control" invented by Wilmer Paul Harbour, Jr. et al., filed Apr. 27, 1965, Ser. No. 451,189 and assigned to the assignee of this application.

OTHER REFERENCES

The following additional references are of interest:

IBM Field Engineering Theory of Operation for the 2740/2741 Communications Terminal, Form Number Y27-0013-0, dated 1966.

IBM Customer Engineering Instruction Manual for the "Selectric" (trademark) Printer, Form No. 241-5032-2, dated January 1966.

IBM Customer Engineering Manual of Instruction for "Selectric" Input/Output Keyboard Printer, Form No. 241-5159-2, dated 1965.

IBM Customer Engineering Universal Reference Manual for "Selectric" Input/Output Keyboard Printer, Form. No. 241-5182-0, dated June 30, 1963.

BRIEF BACKGROUND OF INVENTION

Field

This invention relates to a buffered teletypewriter device and, more particularly, to a teletypewriter terminal which can honor polling requests while simultaneously utilizing an integral buffer storage to compose messages for later transmission.

Description of the prior art

Modern data communication has taken the form of many communication terminal devices located at remote points which are interconnected through central processing and switching units to one another and to the central processor. Many of today's modern terminals utilize buffer storage devices to temporarily store the information keyed in by operators until a significant amount of information has so been stored. At this time, the information stored in the temporary or buffer storage device is transmitted to the central processor to another terminal where it is collected in a similar storage device. The utilization of such storage devices enables the communication network to operate at a maximum efficiency inasmuch as the system is not held down to the speed of the operator, but can operate to effect message transfer at a speed of the storage devices and switching circuits utilized.

An additional benefit derived from the utilization of buffered terminal devices is that operator errors can readily be corrected prior to transmitting the erroneous information. That is, information keyed into the temporary or buffer storage device can be readily corrected by the operator prior to operator initiation of data transmission.

The prior art buffered terminal devices are either large and complex having multiple storage accessing and control circuits or are small and provide little flexibility.

The large terminal devices are utilized in conjunction with high speed communication channels and have a high capacity, high speed storage which is capable of storing vast amounts of information. Additionally, such devices have a vast array of control circuitry which enables the terminal to immediately communicate control information to other such terminals either over a special control communication channel or by multiplexing the control information with data information.

Conversely, the small buffered terminal devices have virtually no control circuitry to enable them to immediately communicate control information to other such terminals. This factor has limited the number of such prior art terminal devices which can be utilized in a single network since such prior art devices generally ignore requests for control information when they are being used for another function and thereby tie the network up for a predetermined time interval.

Further, the small storage capacity of small terminal devices places an additional constraint on the communications network in terms of the size or length of the message that can be transmitted. Large scale terminal devices have avoided this constraint by utilizing storage overlapping techniques and message interrupt techniques. Storage overlapping is not effective for small terminals because of their low capacity storage and because of the complexity of control involved. Message interrupt could not be effectively utilized in small prior art terminals because they lacked an immediate control communications link with the sending station.

Additionally, while message interrupt circuits work efficiently with large terminal devices which are connected to high speed communication channels, they are ineffective when utilized in conjunction with a low speed (e.g. 75 band) channel. This is because when utilizing high speed channels, the sending station or central processor can service other terminals while awaiting the storage printout of the interrupted terminal and subsequently return to the interrupted terminal without causing undue delay at the sending or receiving station.

However, when such interrupt devices are utilized in conjunction with low speed lines it is necessary that the central processor remain ready to complete the message at the cessation of the printout interrupt since there would be insufficient time to service another terminal and return to the interrupted terminal without introducing an appreciable time delay for the interrupted terminal.

SUMMARY

In order to overcome the above problems of the prior art and to provide a small teletypewriter terminal having relatively few components while maintaining the flexibility of large terminals, the teletypewriter terminal of the present invention is provided with a buffer storage and two registers which are uniquely connected to the buffer storage, the keyboard, the output printer, the control unit, and the transmitter and receiver. The unique connection of these registers allows the simultaneous utilization of the terminal for handling polling requests and for manipulating data from the keyboard to the buffer or from the buffer to the printer. Additionally, the same registers are utilized in the transmission of data to and the receipt of data from the remote stations thereby reducing terminal complexity and cost.

An additional feature of the present teletypewriter terminal is that received information may be sent directly to the printer or it may be sent to the buffer memory in accordance with the speed of the message transfer. Hence, if the terminal is connected to a low speed communication channel, the received information can be directly printed without disturbing the condition of the buffer and without necessitating message interrupt and delay when the buffer is being emptied. When received information is sent directly to the printer it is necessary to "buffer" the line from the printer because of the asynchronous operation of the line and printer. The unique connection of registers also performs this additional buffering.

If the information is received from a high speed channel, it is sent to the buffer storage for subsequent printout upon termination of message transmission. When the length of the message exceeds the storage capacity of the buffer storage, a message interrupt is initiated.

The foregoing and other features and advantages of the invention will be apparent from the following more particular description of the preferred embodiment of the invention as illustrated in the accompanying drawings.

GENERAL DESCRIPTION

The buffered teletypewriter of the present invention has four basic modes of operation which are: entry, printout, transmit and receive. When the terminal is performing an entry operation, information is entered into the buffer storage of the terminal from a local input device such as a keyboard, card reader, magnetic media reader etc. During a printout operation, information located in the buffer storage of the terminal is outputed to a printer or similar local output device. When the terminal is in transmit mode, information is transmitted from the buffer storage device of the terminal to a remote station. When in receive mode, information is received from the remote station and either directly printed or stored for subsequent printout.

Figure 1:
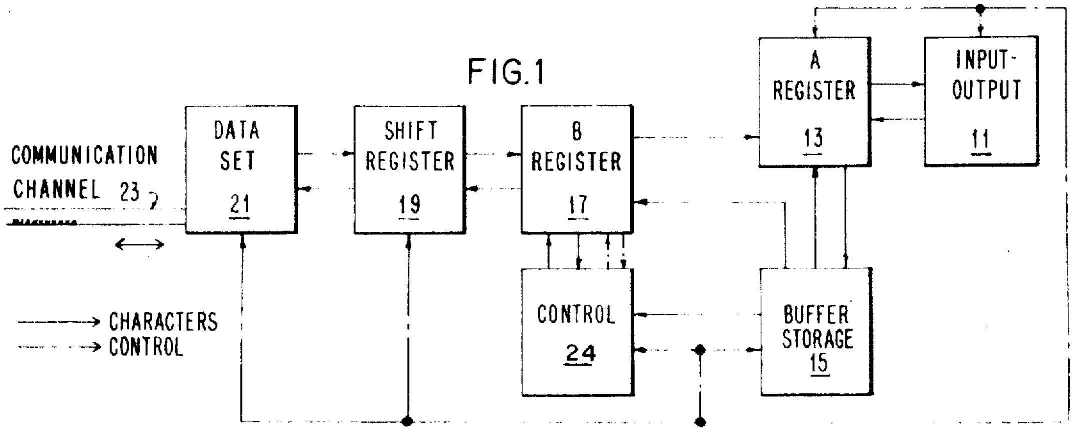
FIGURE 1 is a block diagram representative of the data flow path of the buffered teletypewriter device.

Referring now to the drawings, and more particularly to FIGURE 1 thereof, a block diagram representation of the data flow of the buffered teletypewriter device is shown.

Input/output device 11 is utilized to both enter information into the system and output information from the system. The input device can be a standard teletypewriter keyboard and the output device can be a standard teletypewriter printer. An example of such a device is the IBM "Selectric" Input Output Typewriter, described in the afore-referenced typewriter manuals. The A register 13 is a data register capable of storing in coded bit form the electronic signal representation of a complete character. The size of the register is dependent upon the size of the character set utilized. Buffer storage 15 is a storage device capable of storing a plurality of data characters. B register 17 is a data register similar to A register 13. Shift register 19 is a data register which can store in coded bit form the electronic signal representation of a complete data character and which can gate this signal representation out serially a pulse at a time. Data set 21 converts pulse coded information from shift register 19 to frequency coded information to be transmitted over communication channel 23 and converts frequency coded information received from communication channel 23 to pulse coded information. Control 24 controls the data flow of the terminal and causes the terminal to respond to polling requests. A register 13, B register 17, shift register 19 and data set 21 are described in further detail in the aforereferenced 2740 Communications Terminal Manual. Buffer storage 15 and control 24 will be described hereinafter in further detail with respect to FIGURES 2 and 3 respectively.

When in entry mode, information keyed in from the keyboard of input/output device 11 is sent to A register 13 in the form of electrical signals, a character at a time (serially by character, parallel by bit). The information character in A register 13 is then stored in buffer storage 15. The transfer of the character in A register 13 to buffer storage 15 can either be serially by bit or parallel by bit in accordance with the configuration of buffer storage 15. In the description which follows, transfer from and to buffer storage 15 will be serially by character, serially by bit.

When the terminal is in print out mode, information stored in buffer storage 15 is gated out of the buffer storage to A register 13. Once a complete character has been received by A register 13, it is sent to the output printer of input/output device 11 whereupon the electrical signals representative of an information character are converted to mechanical movement of appropriate printer linkages which effect printing of the designated character.

When it is desirous to transmit the information stored in buffer storage 15 to a remote station, the operator places the terminal in its transmit mode. When the receiving station or central terminal acknowledges the request to transmit or polls the terminal as will be described hereinafter, information located in buffer storage 15 is gated into B register 17 a character at a time (serially by character and either serially or parallel by bit in accordance with the configuration of buffer storage 15). The character thus stored in B register 17 is then transfered to shift register 19 serially by character and parallel by bit.

It is to be noted at this point that if buffer storage 15 transferred characters from the buffer storage in a parallel by bit manner, the intermediate storage supplied by B register 17 would be unnecessary and characters could be gated from buffer storage 15 directly to shift register 19. However, since a low cost serial by character serial by bit buffer storage device is utilized in the preferred embodiment, B register 17 is utilized as an intermediate storage in the transmit mode to insure that a steady flow of data bits will be transmitted.

Once a data character has been transferred in a parallel by bit manner to shift register 19 the character is gated out of the shift register a bit at a time to data set 21. The pulse coded information thus gated from shift register 19 is converted into frequency coded information by data set 21 and sent to the receiving station via communication channel 23.

When the terminal is in a receive mode, received frequency coded data from communication channel 23 is converted by data set 21 to pulse code and stored in shift register 19. The received information is stored serially by character and serially by bit. When a complete character has been stored in shift register 19, it is sent to B register 17 and then to A register 13 serially by character and parallel by bit.

At this point, the data is either gated to buffer 15 to be temporarily stored, or sent directly to the output printer of input/output device 11. If the transmission rate of the communication channel 23 is slower than or equal to the speed of the output printer, information located in the A register 13 is gated directly to the output printer without disturbing the contents of the buffer storage 15. If, however, the transmission rate of the communication channel is higher than the output speed of the printer, the information is gated directly to buffer storage 15.

Information thus gated into buffer storage 15 is sent to the output printer as described above upon the completion of the transmission. Transmission is completed either when a special end-of-message character is received and recognized by control 24 or when the message transmitted overflows the storage capacity of the buffer storage 15. In either instance, control 24 initiates the printout. When an overflow condition exists, control 24 also initiates a message interrupt signal which is sent to the B register and then to data set 21 and the sending station in the same manner that a data character is transmitted. Upon completion of the buffer storage printout, transmission is again reinitiated and the same procedure follows until the message is completed.

As heretofore mentioned, the terminal is always responsive to polling requests (control characters) sent by the central station. When the central station sends the terminal a request to transmit or receive information, the request is received from the communication channel 23 and sent to B register 17 in the same manner that data information is sent to the B register 17 as described above.

Control 24 decodes each character received by B register 17 in order to determine whether it is a data character or a control character. If the character so received is a control or polling character and if a sequence of subsequent polling characters received by the control 24 request the terminal to transmit or receive information, control 24 checks the status of the terminal to determine whether the operator has placed it in a transmit or receive mode. If the terminal is in the proper mode, control 24 initiates a positive response to the requesting station indicating that the terminal is ready to transmit or receive information. This response is sent through B register 17, shift register 19, and data set 21 to the communication channel 23. If the terminal is not in the proper mode, the control initiates a negative response which is sent in a similar manner through the communication channel to the requesting station. Additionally, the control 24 indicates through a light or other indicator to the operator that the station has been polled. The operator can then put the terminal in the proper mode or can ignore the request.

It is to be noted that only when the terminal is in a receive mode and has been polled with control 24 allow the data information in the B register 17 to be gated to the A register 13. Thus, when the terminal is in some other mode of operation (for example data entry or data printout), information sent to the terminal will be decoded to determine if it is polling information and if it is, the proper response will be sent as described above. If, however, the information sent is data, control 24 blocks the data from entering into the A register 13 and then on to the buffer storage 15 or the input/output device 11. Thus, polling requests are honored while the terminal is being simultaneously put to another use.

When information is being received and printed directly, it is necessary to "buffer" the output device and the communication channel. This is because the devices run asynchronously thereby prohibiting the direct drive of the output device from the communication channel. For example, when the printer has completed printing a line, it is necessary for the print carrier element to return to the left-hand margin. If the transmitter were transmitting directly to the printer, the data character transmitted during the carrier return would be lost. However, with the system of the present invention, the data character so transmited is stored in the A register. The next subsequent data character is stored in the B register, and the next subsequent data character is stored in the shift register. Thus, the two devices are buffered from one another by three registers. This buffering takes place in the identical manner as in the prior art IBM 2740 Communications Terminal described in the above referenced Customer Engineering Manual of Instruction.

DETAILED DESCRIPTION

Figure 2:
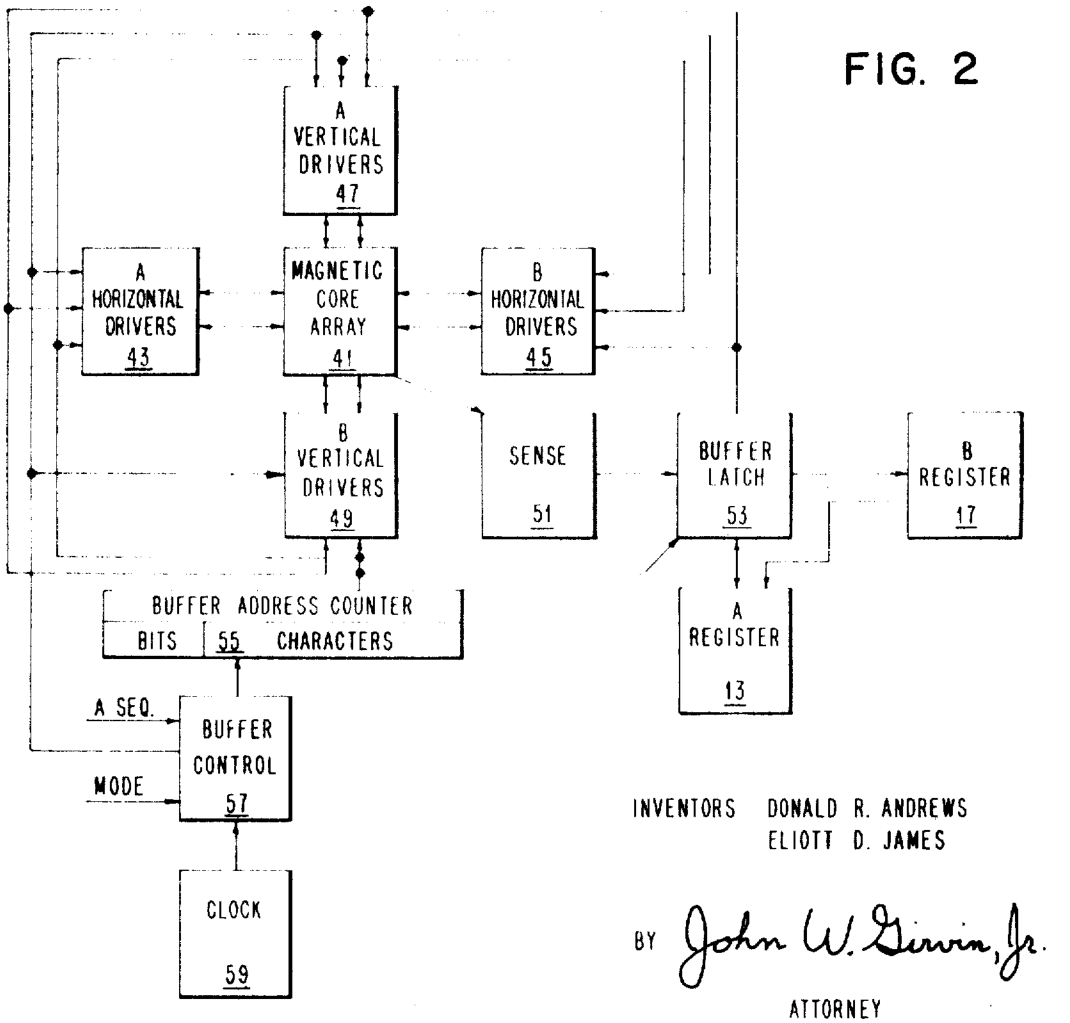
FIGURE 2 is a block diagram representative of the buffer storage and its connections to the data registers.

The buffer storage 15 and its connections to the A register 13 and the B register 17 are shown in further detail in FIGURE 2. Referring now to FIGURE 2, the buffer storage consists of a two and one-half dimension magnetic core storage array 41 having associated therewith A and B bi-polar horizontal current drivers 43 and 45 respectively, A and B bi-polar vertical current drivers 47 and 49 respectively, and sense amplifier detector circuit 51. As is appreciated by those skilled in the art, the magnetic cores are arranged in an array and each core assumes one of two magnetic states. The magnetic state of each of the cores indicates whether it stores a binary one or a binary zero representation of a data bit.

As mentioned heretofore, the buffer storage device to be described is a serial by bit, serial by character storage. Thus, in order to gate a single character into or out of the core array, a plurality of bit cycles equal to the number of bits comprising a character must be taken. Each bit cycle consists of a read cycle and a write cycle. During the read cycle, the information content of the selected magnetic core representative of the desired character bit is sampled thereby setting the core to its zero state. During the write cycle, information is "written" into the selected core and the core assumes a one state or remains in the zero state in accordance with the information content.

A single core in the array is selected by energizing an A and a B horizontal current driver and an A and a B vertical current driver. To read information from the core, one-half select current is driven from the A drivers to the B drivers while to write information into a core, one-half select current is driven from the B drivers to the A drivers. If the selected core changes state during a read cycle, a discernible pulse is detected by the sense amplifier 51. This detected pulse represents a binary one. Conversely, if the selected core does not change state during the read cycle, the failure to detect a discernible pulse by the sense amplifier 51 represents a binary zero. The detected information bit is stored in single bit buffer latch 53 during a read operation. During the write cycle of the bit cycle, the buffer latch 53 is sampled and if it contains a binary one information bit, the bi-polar current drivers drive the selected core to its "one" state. If buffer latch 53 contains a binary zero information bit, the bi-polar current drivers are inhibited and the selected core retains its zero state.

Buffer address counter 55 activates the proper current drivers in accordance with the character and bit to be read into or out of storage. Initially, the character counter will indicate that the first character is to be read in or out and the bit counter indicates that the first bit of that character will be read in or out. Thereafter, the bit counter advances until a complete character has ben read in or out and at this time resets to its initial position. The reset of the bit counter causes the character counter to advance by one and the sequence continues until the counters are reset in accordance with external data requirements.

Buffer control 57 initiates a character read or write in accordance with the data transfer to be effected as determined by the terminal operation. Clock 59 supplies timing pulses to the buffer control 57 as well as to sequence latches (shown in FIGURE 3) which control data flow from and to A register 13 and B register 17.

As described above with respect to FIGURE 1, information can be sent to the buffer storage only from A register 13. Thus, for the purposes of the following description, it will be assumed that the bit latches of the A register have been set in accordance with the information character to be stored. At this time, the bit counter of buffer address counter 55 has been reset so that the first core gated by the current drivers will represent the first bit of the character. On the next subsequent clock pulse from clock 59, the A and B horizontal and vertical drivers associated with the selected core are gated on by buffer control 57 and buffer address counter 55. Read current is then driven from the A drivers to the B drivers thereby setting the selected core to its zero state. At this time, the bit latch in A register 13 corresponding to the first character bit is sampled. The information content of the sampled bit latch is transferred to buffer latch 53. The next subsequent clock pulse causes current to be driven from the selected B current drivers to the selected A current drivers thereby setting the selected core to a one state only if buffer latch 53 contains a binary one. If buffer latch 53 contains a binary zero, no current is driven from the B drivers to the A drivers and the selected core retains its zero state. At the conclusion of the write cycle, the bit counter of buffer address counter 55 is incremented.

On the next subsequent clock pulse, the core representative of the second bit of the character is read out while the bit latch representative of the second character bit position of A register 13 is sampled and its information content sent to the buffer latch 53. The next clock pulse causes the information content of the buffer latch to be transferred to the selected core as described above. This operation continues until all of the bits of the character have been so transferred from A register 13 to magnetic core array 41. When the last bit of the character has been so transferred, the bit counter of buffer address counter 55 resets thereby causing the character counter to increment. At this time the next character to be stored can be gated into A register 13 and transferred to magnetic core array 41 in the same manner as described above. Characters can continue to be so stored until the storing operation is stopped or until the number of characters to be stored exceeds the capacity of magnetic core array 41. If the terminal is in entry mode and the storage capacity will be exceeded after the character located in the A register is transferred to the core array, buffer control 57 causes the keyboard of the input device to be interlocked. If the terminal is in receive mode, buffer control 57 causes a special overflow signal to be generated.

As described above with respect to FIGURE 1, information can be transferred from the buffer storage to either A register 13 or to B register 17. The read operation differs from the write operation heretofore described in that during the read cycle of the bit cycle, sense amplifier detector circuit 51 detects a change in the magnetic state of the selected core and gates this information to buffer latch 53. Of course, the bit latches of A register 13 are not sampled as in a write operation and buffer latch 53 thus assumes a state dependent upon the state of the sampled core. During the write cycle of the bit cycle, the information content of buffer latch 53 is gated back to magnetic core array 41 as in the write operation. Additionally, the appropriate bit latch of A register 13 or B register 17 is gated and the information content of buffer latch 53 is transferred to the gated register bit latch. A complete character is loaded when the bit counter resets. The next subsequent character is read when the register requests it.

It should be noted that the buffer address counter 55 is set to zero at the beginning of each keyboard entry operation, receive operation, transmit operation or buffer print operation, so that the counter always steps sequentially through the core addresses thereby gating out the complete contents of the magnetic core array.

Figure 3:
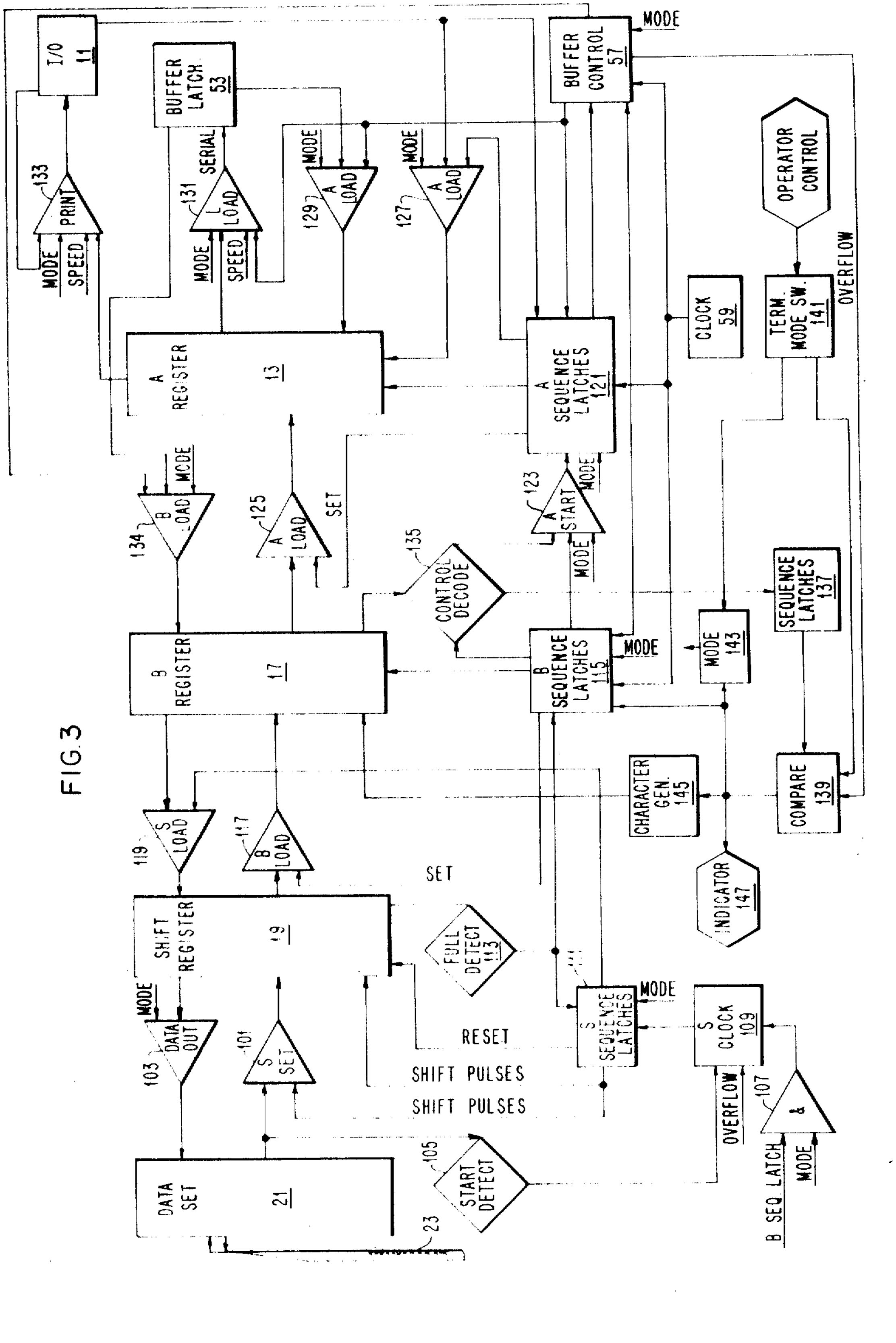
FIGURE 3 is a detailed block diagram of the buffered teletypewriter device.

Referring now to FIGURE 3 of the drawings, a detailed block diagram of the teletypewriter terminal showing the registers described in conjunction with FIGURE 1 along with their gating and control circuits is depicted. As described with respect to FIGURE 1, there are four basic modes of operation: entry, printout, transmit and receive. In an entry operation, information is keyed in from the keyboard of the I/O device 11 to the A register 13, then to the buffer latch 53 and finally to the buffer storage as described above with respect to FIGURE 2. Information located in the buffer storage is printed out on the output printer of the I/O device when in printout mode by gating the information from the core storage to the buffer latch 53 as described with respect to FIGURE 2 then to the A register 13 and to the printer. When transmitting, information is read from the buffer storage by reading it out to the buffer latch 53, to the B register 17, then transferring it through the shift register 19 to the data set 21. When in receive mode, information is received at the data set 21, sent to shift register 19, then to B register 17, to A register 13, and then either to the output printer of the input/output device 11 or to the buffer latch 53 and then to the core storage.

The remaining elements and circuits shown in FIGURE 3 are sequencing, gating, and detecting circuits depicted generally as control 24 in FIGURE 1 which control the sequencing and routing of information through the registers. In the following description, the function of each of these circuits will be briefly described. Thereafter will follow a description of the operation of the terminal as depicted in FIGURE 3 in each mode.

S set gating circuit 101 gates data which has been serially received at data set 21 into shift register 19. Data out gating circuit 103 gates data serially from shift register 19 to data set 21. Start detect circuit 105 detects the presence of a received bit of information at data set 21. It operates in conjunction with clock start gating circuit 107 to cause S clock 109 to start. S clock 109 is a timing input to the S sequence latches 111 which in turn control the gating of information into and out of shift register 19. Full detect circuit 113 detects when shift register 19 is completely full and indicates the full condition of this register to the S sequence latches 111 and to the B sequence latches 115. The information located in shift register 19 is transferred in parallel to B register 17 through B load gating circuit 117 under control of B sequence latches 115. Information located in B register 17 is gated in parallel to shift register 19 by S load gating circuit 119 under the control of S sequence latches 111.

A sequence latches 121 control the sequencing of information into and out of A register 13 and are gated by buffer control 57 or A start gating circuit 123. Information is loaded into A register 13 from B register 17 in parallel through A load gating circuit 125 under the control of A sequence latches 121. Information is gated into the A register 13 from the I/O device 11 through A load gating circuit 127. This information transfer is also in parallel and is controlled by the A sequence latches 121. Information is gated into A register 13 from the buffer storage through buffer latch 53 and A load gating circuit 129. This information transfer is serially by bit. Information is transferred from the A register to core storage through latch load gating circuit 131 serially by bit under control of buffer control 57. Information is gated from A register 13 to the output printer of I/O device 11 through printer gating circuit 133 in parallel. The I/O device indicates the correct receipt of a character and forms a feedback loop with printer gating circuit 133.

Information is transferred to B register 17 from the storage device through buffer latch 53 and B load gating circuit 134 serially by bit and serially by character under control of buffer control 57.

Clock 59 supplies a timing input to the B sequence latches 115, the A sequence latches 121, and the buffer control 57.

In order to detect control sequences or polling information transmitted by the central station to the terminal, control code decode circuit 135 decodes each character in the B register 17 which has been loaded therein by shift register 19. Each character so decoded is stored in sequence latches 137. Compare circuit 139 compares the information stored in the sequence latches with the terminal mode switches 141 which are under the control of the operator.

As previously described, there are four basic modes for the operation of each terminal. These modes are: entry, printout, receive, and transmit. The terminal may be placed in any one of these modes in accordance with the wishes of the machine operator. When the terminal is in either a receive or transmit mode, it is also either in a select or non-select submode. Mode control 143 indicates the mode and sub-mode of the terminal. If the terminal mode switches 141 have been set to a receive mode and the sequence latches 137 indicate a request to receive, compare circuit 139 causes mode control 143 to change from receive non-selected to receive select. Compare circuit 139 also causes character generator 145 to generate an affirmative response to be transmitted to the central station. Compare circuit 139 will also pulse the B sequence latches 115 so that the character generated by character generator 145 can be loaded in parallel into the B register and then sent to the shift register 19 for subsequent transmission in the same manner that data is sent to the shift register for transmission.

If the information decoded by the sequence latches 137 does not compare favorably with the terminal mode switch 141 (e.g. a request to receive when terminal is in a mode other than receive), compare circuit 139 causes a negative response to be generated by character generator 145 in the same manner as the affirmative response described above. Compare circuit 139 will further act to prevent the terminal from going into a select sub-mode and the terminal will remain in its previous state without affecting other simultaneous operations of the terminal. Additionally, compare circuit 139 generates a signal to indicator circuit 147 which indicates to the operator that a terminal has been polled and was found to be in a different mode. At the time that the negative or affirmative response is generated, the sequence latches 137 are reset so that they will be ready to receive further polling requests. A request to transmit is handled in the same manner.

OPERATION

The following description will describe the operation of the terminal in each of the major modes: receive, transmit, printout, and entry.

Receive

Referring to FIGURE 3, it will be assumed for purposes of the following discussion that the operator has placed the terminal mode switches 141 into the receive mode. It will further be assumed that the first information received by the terminal will be a polling request from the central transmitting station to the terminal requesting that the terminal receive information to be sent from the central transmitting station.

The first data bit sent by the central transmitting station is received from the communication channel 23 by data set 21. This first bit is detected by start detect circuit 105 which causes S clock 109 to start. S clock 109 gates the S sequence latches 111. These latches cause shift register 19 to be reset and thereafter cause a series of shift pulses to be generated which are sent to shift register 19 and to S set gating circuit 101. Data bits received at data set 21 are then shifted by the shift pulses through the S set gating circuit 101 to shift register 19. It is noted that the information transfer from the data set to the shift register is serial by bit serial by character. When shift register 19 contains a complete character, full detect circuit 113 indicates that a complete character has been received to the S sequence latches 111 and to the B sequence latches 115. The B sequence latches 115 cause the B register 17 to be reset. Thereafter, a B set gating signal is generated which gates the information in shift register 19 through B load gating circuit 117 into B register 17. The information transfer from shift register 19 to the B register 17 is parallel by bit serially by character. The character in the B register 17 is then set to control code decode circuit 135. Since it was assumed that the character transmitted was a polling character, control code decode circuit 135 causes the polling character to be stored by sequence latches 137. Subsequent polling characters are shifted from the data set through the shift register 19 to the B register 17 to the control code decode 135 and to the sequence latches 137 in a similar manner. When a complete polling request has been so stored by sequence latches 137, compare circuit 139 compares the request stored in the sequence latches 137 with the terminal mode as indicated by the terminal mode switches 141.

As it was assumed that the terminal mode switches indicated that the terminal was in a receive mode, and that the polling request requested that the terminal receive information, compare circuit 139 will cause character generator 145 to generate an affirmative response to the central polling station's request. Additionally, it causes mode control 143 to change from a receive mode to an answer transmit mode and then to a receive select mode. The character generated by character generator 145 is gated into B register 17 under control of B sequence latches 115 which have been set by compare circuit 139. Once the character has been loaded into B register 17, the B sequence latches 115 and mode control 143 initiate the transmission of the control character located in the B register to the shift register and on to the communication channel 23. The B sequence latches 115 and the mode control 143 cause an input to be sent to clock start gating circuit 107 which starts S clock 109. S clock 109 gates the S sequence latches 111 which causes the shift register 19 to be reset. Since the character in the B register is to be transmitted, the S sequence latches 111 gate S load gating circuit 119. The information in B register 17 is transferred through S load gating circuit 119 in parallel to shift register 19. Full detect circuit 113 indicates when the transfer of information is complete to the S sequence latches 111. The S sequence latches 111 then generate a series of shift pulses which cause the shift register 19 to gate out the information in shift register 19 through data out gating circuit 103. This information is gated out serially by character and serially by bit. Mode control 143 furnishes the proper gating input to the data out gating circuit 103. Information received serially by data set 21 is converted from pulse code information to frequency code information and sent via the communication channel 23 to the central station.

Upon receiving an affirmative response from the terminal, the central station causes data to be transmitted to the terminal. This data is received by data set 21 from the communication channel 23. The data thus received is sent to shift register 19 and to B register 17 in the same manner as the polling data. This data is in a like manner decoded by control code decode 135. However, since the information received is not polling information, the sequence latches 137 are not set.

Once the B register 17 has been loaded with a data character, B sequence latches 115 indicate to A start gating circuit 123 that a complete character is in the B register and control code decode 135 indicates that it is a data character. Mode control 143 likewise indicates to A start gating circuit 123 that the terminal is in a receive select mode and therefore the information contained in B register 17 should be sent to A register 13. A start gating circuit 123 then provides an enabling signal which gates on the A sequence latches 121 which cause the A register 13 to be reset and which thereafter generate a set signal to A load gating circuit 125. The data in the B register 17 is then transferred in parallel by bit fashion through the A load gating circuit 125 into the A register 13.

Once the information has been received in A register 13, it is then sent either to the output printer of the input/output device 11 or sent to the buffer storage. If a low speed line is utilized, the information in the A register 13 is gated through printer gating circuit 133 by signals on both the speed line and the mode line to that gating circuit. The information transfer from the A register to the output printer is in parallel. If, however, the line speed is high, the information is gated serially from A register 13 through latch load gating cicruit 131 by signals on the mode line and the speed line of that gating circuit. The speed lines represent the output of an operator controlled switch which is set for high or low speed channels. The information transfer to the output printer is under the control of the A sequence latches 121. However, the information transfer to the buffer storage device is under the control of buffer control 57 which gates latch load gating circuit 131 and which causes the bit latches of the A register to be sequentially sampled until the complete character has been stored.

Information gated from the A register to the buffer latch is stored in the core array in accordance with the address defined by the buffer address counter 55 of FIGURE 2. Once a complete character has been so stored in the core storage under the control of buffer address counter 55, the buffer control 57 indicates to A sequence latches 121 that the character has been transferred and that the next character may be transferred into the A register 13. If A start gating circuit 123 has previously indicated that a data character is awaiting transfer from the B register 17 to the A register 13 or if it subsequently so indicates, A sequence latches 121 generate a reset pulse to reset the A register latches and then generate a set pulse to A load gating circuit 125. In this manner, a complte message is stored in the core memory.

An end of message character is detected by decode 135 which causes the terminal to change from a receive select mode to printout operation. This character is stored in the buffer and causes the termination of the subsequent printout.

If the size of the message exceeds the capacity of the core memory, buffer control 57 indicates that an overflow condition has taken place to compare circuit 139. Compare circuit 139 causes character generator 145 to generate an overflow character response to the central station. Additionally, compare circuit 139 cause mode control 143 to change from a receive select mode to a printout mode and finally to a receive nonselect mode. The overflow condition causes S clock 109 to be turned off and prevents start detect circuit 105 from gating it back on. The overflow character sent to B register 17 is then transmitted in the same manner as described above with respect to affirmative and negative polling response character. The overflow character indicates to the central processing unit that it should stop transmitting information and wait for the terminal to print out the information located in its buffer storage. Thereafter, the central processor can poll the terminal in the same manner as set forth above and start transmitting information at the point where it was interrupted. Of course this operation assumes that a full duplex channel is available. If a one-half duplex channel is used, the terminal must await transmission completion before indicating overflow.

The printing out of the information located in the core memory as well as direct printing from the A register 13 will be described under a subsequent heading entitled "Printout."

Transmit

Data is transmitted from the terminal to the central station only when the terminal is in a transmit-select mode. The operator places the terminal in a transmit mode by manipulating the terminal mode switches 141. Polling characters are sent by the central station to the transmitter requesting that the transmitter send information to the central. These polling characters are received and decoded by the terminal in the same manner as described with respect to receive mode. Compare circuit 139 generates an affirmative response in the same manner as it does when generating an affirmative response to a receive request. After an appropriate affirmative response has been sent to the central, mode control 143 indicates to buffer control 57 that the terminal is now in a transmit select mode. Buffer control 57 causes the information located in the core memory to be gated out to buffer latch 53 serially by bit, serially by character starting at the first character location. The bit located in buffer latch 53 is gated through B load gating circuit 134 into B register 17. B load gating circuit is gated by mode control 143 and buffer control 57. Buffer control 57 causes the information is the buffer latch 53 to be gated to the appropriate latch of the B register 17. When a complete character has thus been transferred from the buffer latch 53 to the B register 17, buffer control 57 impulses the B sequence latches which furnish an input to clock start gating circuit 107. This causes S clock 109 to gate the S sequence latches 111. Since the terminal is in a transmit mode, information is gated from the B register 17 in parallel to the shift register 19 through S load gating circuit 119 in the same manner as described above with respect to an affirmative polling response. At this point, the B sequence latches reset B register 17 and indicate to buffer control 57 that the next character can be loaded. The information located in shift register 19 is sent through data out gating circuit 103 serially by bit and serially by character to the data set 21 and then to communication channel 23 as described above with regard to the affirmative polling response.

Entry

Information can be entered into the buffer storage from the keyboard of input/output device 11 when the terminal is placed in entry mode. When in entry mode, mode control 143 furnishes a gating signal to A load gating circuit 127 which gates the parallel by bit serial by character information from the keyboard into A register 13 under control of A sequence latches 121. When A register 13 has received a complete character, A sequence latches 121 gate buffer control 57 which gates information from A register 13 to buffer latch 53 serially by bit, serially by character through latch load gating circuit 131. Since the terminal is in entry mode, the receive speed input to the latch load gating circuit 131 is ignored. Information thus sent to buffer latch 53 is stored in the appropriate core under the control of the buffer address counter 55 of FIGURE 2 and the buffer control 57 as described above with respect to FIGURE 2. When a complete character has been stored, buffer control 57 impulses the A sequence latches 121 which cause the A register 13 to reset and await a subsequent keyboard entry. Since the B register 17 is not utilized for an entry operation, it is free to handle simultaneous polling requests as has been described.

Printout

Information located in the core memory can be printed out on the output printer of I/O device 11 under two conditions. The first condition is when the operator has entered information into the buffer device and desires to see a printout of it prior to its transmission. The second condition is when the central station has transmitted information to the buffer device and has either ceased its transmission or has been interrupted because of an overflow.

When the operator desires to print out the information content of the core storage, terminal mode switches 141 are placed in printout mode. This causes buffer address counter 55 of FIGURE 2 to address the first data bit of the core memory and gate its information content to buffer latch 53. Information is gated from buffer latch 53 through A load gating circuit 129 serially by bit, serially by character to A register 13. The information is gated from the buffer latch under the control of buffer control 57 and mode control 143. A sequence latches 121 cause the A register to be reset prior to the receipt of information. When a complete character has been transferred from buffer latch 53 to A register 13, buffer control 57 gates A sequence latches 121 which cause the information located in A register 13 to be transferred parallel by bit serially by character through printer gating circuit 133 to the output printer of input/output device 11. Input/output device 11 indicates when it has completed printing the character and is able to receive an additional character. When the output printer is busy, printer gating circuit 133 prevents information from being transferred from A register 13 to the output printer. Since the operation of the core memory device is faster than that of the output printer, it is necessary that the A sequence latches 121 prevent information in the core memory from being loaded on top of a valid character in the A register 13 thereby destroying the information content of the A register prior to its transmission to the printer. A sequence latches 121 so indicate to buffer control 57 that the information located in the A register 13 has yet to be transferred. Buffer control 57 will then prevent core storage accessing until the character in A register 13 has transferred to I/O device 11.

Information is also caused to be printed out of the core memory to the output printer of the input/output device 11 through the same data path after a complete message has been received by the core memory from the central transmitting station or after an overflow condition exists. Either the completion of a message as denoted by a special character detected by control code decode 135 and compare 139 or an overflow condition causes mode control 143 to change from a receive select to a printout mode. This change causes the message located in the core array to be printed out on the output printer in the exact manner as described above. When the complete message has been so printed, mode control returns to a receive non-select mode.

It is of course recognized by those skilled in the art that various changes and modifications may be made to the preferred embodiment without departing from the spirit and scope of this invention. For example, a storage device could be utilized wherein characters are gated in and out in a parallel by bit manner. When such a storage device is utilized, information characters can be transmitted from the storage by sending the characters directly to the shift register and then to the data set.

Additionally, it is possibly to transmit information bits in a form other than frequency code. Thus, the type of data set utilized depends solely upon the requirements of the communication channel.

While the invention has been particularly shown and described with reference to a preferred embodiment thereof, it should be understood by those skilled in the art that the foregoing and other changes in form and detail may be made therein without departing from the scope of the invention.

What is claimed is:

1. A data communications terminal for communicating control and data characters with a remote terminal through a communication channel and having a data input means, a data output means, and a storage means for storing a plurality of data characters comprising:

a first data character storage means connected to said input means, to said output means, and to said stortage means for receiving data characters from said input means and said storage means and for sending data characters to said output means and said storage means;

a second character storage means responsive to said communication channel and connected to said first data character storage means and to said storage means for receiving data characters be transmitted through the communication channel from said storage means and for receiving data characters from said communication channel and sending them to said first data character storage means, said second character storage means also receiving control characters from said communication channel; and control means connected to said first data character storage means, to said second character storage means, and to said storage means, said control means including decoding means for detecting control polling characters transmitted to said second character storage means by the communication channel, generating means responsive to said decoding means for generating a responsive control character upon detection of a polling character by the decoding means, and gating means for gating said responsive control character to said second character storage means for subsequent transmission through the communication channel.

2. The data communications terminal set forth in claim 1 wherein said control means includes enabling means for enabling the transfer of data characters from said second character storage means to said first data character storage means when said terminal is receiving data information and for preventing said transfer when the terminal is not receiving data information.

3. The data communications terminal set forth in claim 2 wherein said control means further includes mode switching means including exclusively operable first means for effecting the transfer of data characters from said input means to said first data character storage means, then to said storage means, second means for effecting the transfer of data characters from said storage means to said first data character storage means then to said output means, third means for providing a first gating signal to said generating means to generate an affirmative responsive control character when said decode means detects control polling characters which request the terminal to transmit information and fourth means for providing a second gating signal to said generating means to generate an affirmative responsive control character when said decode means detects control polling characters which request the terminal to receive information.

4. The data communications terminal set forth in claim 3 wherein said control means further includes mode select means responsive to said mode switching means and to said decoding means exclusively operable for gating data characters from said storage means to said second character storage means then to said communication channel and for indicating to said enabling means that the terminal is receiving data characters.

5. The data communications terminal set forth in claim 1 wherein said control means includes routing means for effecting transfer of data characters received by said first data character storage means from said second character storage to said output means when the data transmission rate of the communication channel is less than or equal to the average output rate of said output means and for effecting transfer of said received data characters to said storage means when said data transmission rate is greater than said average output rate.

6. The data communications terminal set forth in claim 1 wherein said generating means are responsive to said storage means for generating an overflow control character when the capacity of said storage means is exceeded by the length of a received message from said communication channel; and said gating means are responsive to said storage means for gating said overflow control character to said second character storage means for subsequent transmission through the communication channel.

7. The data communications termnial set forth in claim 4 having a third character storage means connected to said second character storage means and to the communication channel for receiving a complete character from said second character storage means and for transmitting said character a data bit at a time over said communication channel, said third character storage means also receiving characters from said communication channel a data bit at a time and sending a complete received character to said second character storage means.

8. The data communications terminal set forth in claim 7 wherein said storage means stores data characters a data bit at a time.

9. The data communications terminal set forth in claim 8 wherein said data input and said data output means comprise a teletypewriter having a printer for data output and a keyboard for data input.

References Cited

UNITED STATES PATENTS

| | | | |
|---|---|---|---|
| 3,348,209 | 10/1967 | Brooks | 340—172.5 |
| 3,340,515 | 9/1967 | Little | 340—172.5 |
| 3,333,250 | 7/1967 | Hill et al. | 340—172.5 |
| 3,328,766 | 6/1967 | Burns et al. | 340—172.5 |
| 3,312,950 | 4/1967 | Hillman et al. | 340—172.5 |
| 3,311,889 | 3/1967 | Birmingham et al. | 340—172.5 |
| 3,293,618 | 12/1966 | Klein | 340—172.5 |
| 3,200,379 | 8/1965 | King et al. | 340—172.5 |
| 3,046,528 | 7/1962 | Rowe et al. | 340—172.5 |
| 2,960,683 | 11/1960 | Gregory et al. | 340—172.5 |

GARETH D. SHAW, Primary Examiner